United States Patent [19]

Shapiro

[11] Patent Number: 4,899,128
[45] Date of Patent: Feb. 6, 1990

[54] METHOD AND APPARATUS FOR COMPARING STRINGS USING HASH VALUES

[75] Inventor: Ehud Y. Shapiro, Rehovot, Israel

[73] Assignee: Yeda Research and Development Co., Ltd., Rehovot, Israel

[21] Appl. No.: 807,552

[22] Filed: Dec. 11, 1985

[51] Int. Cl.⁴ .................................................. G06F 7/02
[52] U.S. Cl. .................................................. 340/146.2
[58] Field of Search ............... 364/200, 300, 715, 900; 340/146.2, 347 DD; 235/310

[56] References Cited

U.S. PATENT DOCUMENTS

| | | | |
|---|---|---|---|
| 4,295,124 | 10/1981 | Roybal | 340/347 DD |
| 4,558,302 | 12/1985 | Welch | 340/347 DD |
| 4,575,795 | 3/1986 | Boothroyd et al. | 364/200 |
| 4,651,300 | 3/1987 | Suzuki et al. | 364/900 |
| 4,655,620 | 4/1987 | Adams et al. | 364/900 X |
| 4,671,684 | 6/1987 | Kojima et al. | 364/900 X |
| 4,672,571 | 6/1987 | Bass et al. | 364/900 |
| 4,728,925 | 3/1988 | Randle et al. | 340/146.2 |

OTHER PUBLICATIONS

Amsbury, "Data Structures from Arrays to Priority Queues", pp. 48–49, 337–346, Wadsworth Publishing Company, 1985.
Clocksin et al., "Programming in Prolog", pp. 245–249, Springer—Verlag, 2nd Edition, 1984.
Shapiro, "A Subset of Concurrent Prolog and Its Interpreter", Technical Report TR-003, ICOT, Tokyo, 1983.

Primary Examiner—Gary V. Harkcom
Assistant Examiner—Tan V. Mai
Attorney, Agent, or Firm—Pennie & Edmonds

[57] ABSTRACT

To facilitate the comparison of strings in logic programming, a hash code is added to each string having a value that depends on the contents of the string. Typically, this hash code is made part of the header for the string along with a string identification number, a number specifying the length of the string and a bit specifying whether the string is a run time string or a compile time string.

15 Claims, 3 Drawing Sheets

METHOD AND APPARATUS FOR COMPARING STRINGS USING HASH VALUES

BACKGROUND OF THE INVENTION

This relates to a method and apparatus for comparing strings by comparing hash codes associated with such strings. It is especially useful in comparing strings in the environment of parallel logic programming.

One example of a logic programming language is PROLOG (PROgramming in LOGic). W. F. Clocksin and C. S. Mellish, *Progamming in Prolog,* (Springer-Verlag, 2d Ed. 1984) (hereinafter *"Clocksin"*). As indicated in *Clocksin* there are many different implementations of Prolog currently available. *Clocksin* describes at length a "core Prolog" and provides in Appendices D and E descriptions of the implementation of Prolog for the DEC system-10 and for Z80-based microcomputers running under the CP/M operating system. *DEC system-10* Prolog User's Manual, Dept. of Artificial Intelligence, University of Edinburgh (Edinburgh, Scotland); *micro-PROLOG: Programming in Logic,* by K. L. Clark and F. G. McCabe (Prentice-Hall, 1984). *Clocksin* also references at page 288 a PROLOG system that runs under UNIX as described in *C-Prolog User's Manual,* CAAD Studio, Dept. of Architecture, Univ. of Edinburgh, (Edinburgh, Scotland) and a system which runs on several computers from a Z-80 under CP/M to a VAX under VMS as described in *Prolog-1 User's Manual,* Expert Systems Ltd. (9 West Way, Oxford, England). (DEC system-10, VAX, VMS, Z80 and CP/M are all trademarks).

It is common in any implementation of PROLOG to generate many strings of data. In conventional implementations of PROLOG, all these strings are stored in one large string area or table and the strings are referenced by pointers to the addresses of the strings in the table. In such an arrangement each different string need be stored only once in the table; and the same pointer can be used at many different points in a program to refer to the same string.

A basic operation in logic programming is unification, a process which requires the comparison of strings. See *Clocksin* §10-4, which is incorporated herein by reference. Since each string in the table has a unique pointer, such comparison can be effected by comparing the pointers to the strings. If the pointers are different, they point to different strings. If they are the same, the strings likewise are the same.

Such a comparison technique, however, works only in a centralized organization where pointers can be systematically assigned to the individual strings so that there is a one-to-one relationship between the different pointers and the different strings. In operating systems where assignments of pointers to strings are being made simultaneously by two or more programs running in parallel, such assignments cannot readily be made because the parallel programs must run independently to achieve reasonable levels of efficiency. As a result, in systems such as Concurrent PROLOG (Ehud Shapiro, "A Subset of Concurrent Prolog and Its Interpreter", Technical Report TR-003 (ICOT, Tokyo, 1983)), there is no one-to-one relationship between different pointers and different strings and strings cannot be compared by just comparing their pointers.

SUMMARY OF THE INVENTION

To facilitate the comparison of strings in logic programming, I have added to each string a hash code whose value depends on the contents of the string. Typically, this hash code is made part of the header for the string along with a string identification number, a number specifying the length of the string and a bit specifying whether the string is a run time string or a compile time string.

The hash code can be generated by any available technique. For example, the binary values of the elements of the string can be converted by a known formula to a numeric value which is stored as a hash code. While two different strings might have the same hash code, it is certain that two strings with different hash codes will be different.

In accordance with the invention, a comparison of two strings coded with hash codes is then made by first comparing the pointers. If the pointers are the same, then the strings are the same. If the pointers are different, then the hash codes of the two strings are compared. This comparison can readily and quickly be effected in hardware or software. If the comparison fails, it is known that the two strings are not identical and the operating program can move on to the next operation. On the other hand, if the comparison succeeds, the two strings may be identical, but it is necessary to perform additional comparisons to establish this. For example, each of the elements of the two strings could then be compared. Alternatively, additional hash codes, generated independently of the first hash code, could be compared.

By comparing hash codes first, the need to compare strings is eliminated for most strings, thereby speeding up the string comparison function. Obviously, the increase in speed is a function of the number of different hash codes that are used and this number can be varied depending on the circumstances.

Furthermore, if two strings are found identical and if one of them is a run time string, then the run time string can be changed to be a pointer to the other string, thus reducing the number of strings in the system.

BRIEF DESCRIPTION OF THE DRAWINGS

These and other objects, features and advantages of my invention will be more readily apparent from the following detailed description of a preferred embodiment of the invention in which.

DESCRIPTION OF PREFERRED EMBODIMENT OF THE INVENTION

In any implementation of Prolog, numerous strings of data will be generated. Typically, these stings are stored in a table, and the strings are referenced by pointers at the addresses of the strings in the table. Typically, the string includes a header comprising a string identification number, a number specifying the length of the string and a bit specifying whether the string is a run time string or a compile time string.

Figure 1:
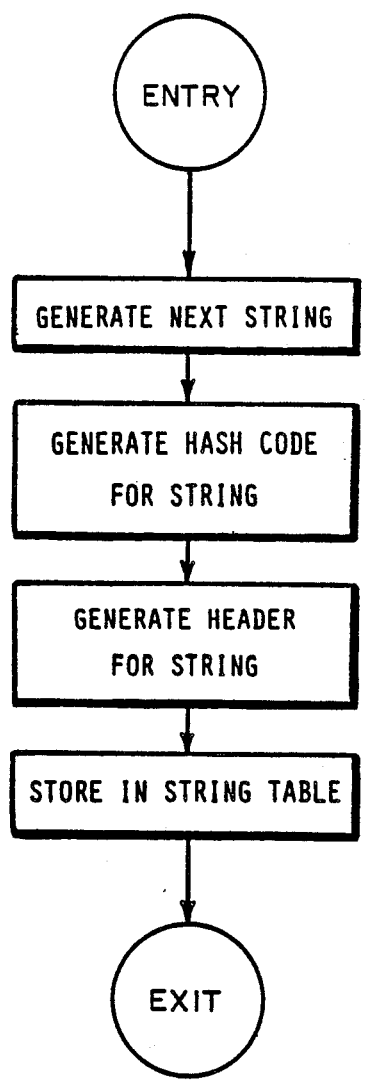
FIGS. 1 and 2 are flow charts illustrating the implementation of a preferred embodiment of the invention.

As shown in FIG. 1, in accordance with the invention, the header also includes a hash code that is a numeric value generated by a predetermined formula from the elements of the string. The number of elements in the hash code typically will be considerably smaller than the number of data elements in the string, perhaps by a factor of ten or more; and as a result the same hash code may be assigned to more than one string. The string and the header associated with the string are then stored in the string table; and the string is referenced by a pointer to the address of the string in the table.

Figure 2:
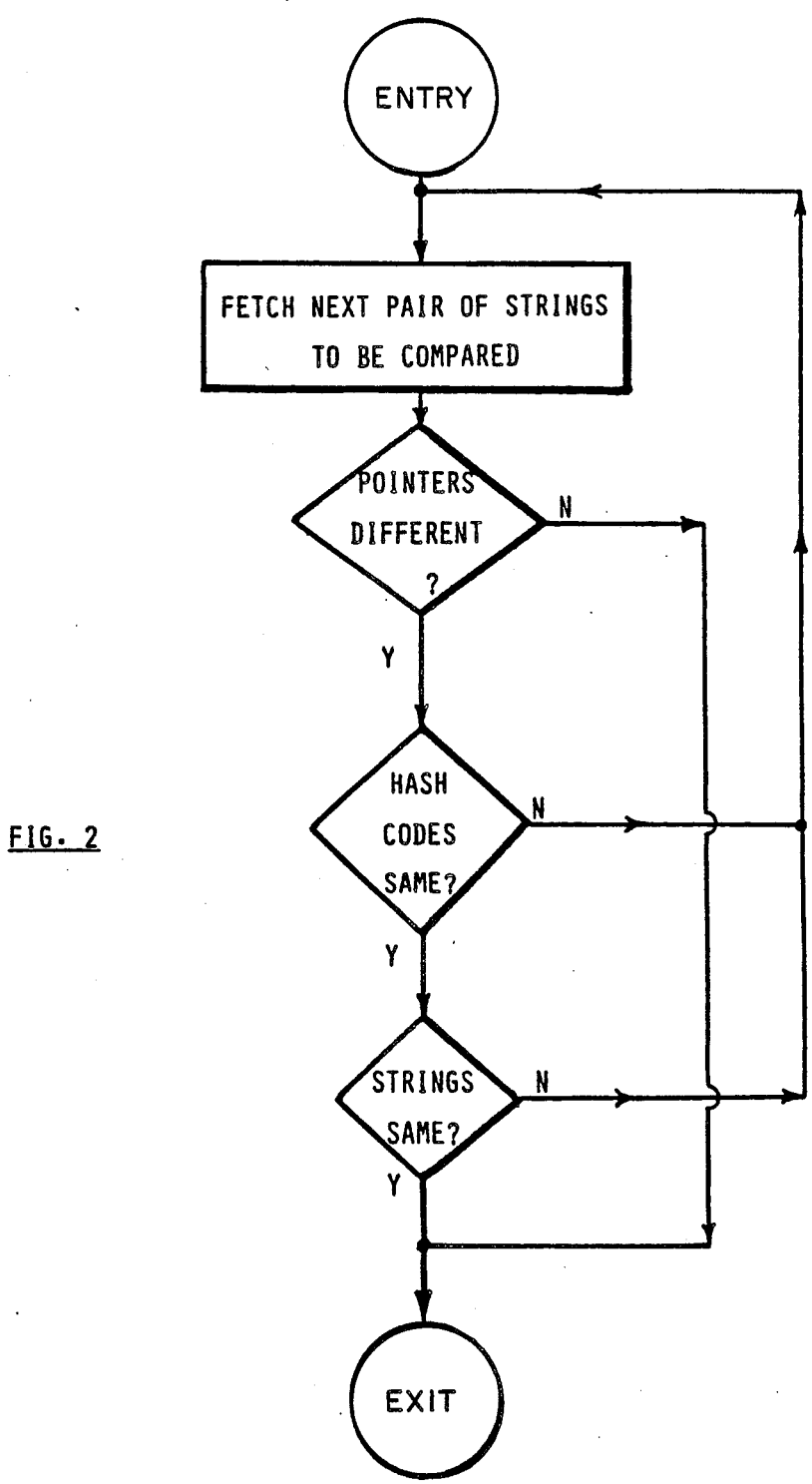

Thereafter, if it becomes necessary to compare strings as in the operation of unification, the comparison can be speeded up by comparing hash codes before comparing the individual items of the string because the hash codes are considerably shorter than the length of the average string. In particular, as shown in FIG. 2, the pointers at two strings are first compared. If the pointers are the same, the strings are the same and the process of unification is complete. If the pointers are different, the procedure then compares the hash codes of the two strings. If the hash codes are different, the two strings must be different; and the operating program can move on to the next operation. On the other hand, if the two hash codes are the same, then it is possible that the strings are identical, although it is necessary to perform additional comparisons to establish this since two strings may have identical hash codes. Thus, the next step might be to compare the individual elements of the strings. Alternatively, additional layers of hash codes might first be tested for identity before comparing each of the elements of the strings. In any event, to establish that the two strings are identical, it is necessary to test something associated with the string that is unique to the data in that string.

Since hash codes are compared before the strings are compared, this procedure eliminates the need to compare the strings for all those cases where the hash codes are different. Obviously, the increase in processing speed that can be attained is a function of the frequency at which identical strings are encountered, the frequency at which identical hash codes are encountered, and the average lengths of the hash codes and the strings.

If two strings are found to be identical and if one of them is a run time string, then the run time string can be changed to be a pointer to the other string, thus reducing the number of strings in the system. To accomplish this, after two strings are determined to be identical the operating program simply tests the bit in the string headers which indicates if the string is a run time string or a compile time string. If either string is identified as a run time string, this string is replaced by a pointer to the address of the other string.

The generation of a hash code is a mathematical function and is most easily implemented using a software program which processes the individual elements in a string in accordance with a specific procedure. For example, the binary values of each eight-bit word of a string might be added together to form a number; and all or a portion of that number may be used as the hash code. See, for example, W. Amsbury, *Data Structures From Arrays to Priority Queues*, pp. 48–49, 337–346 (Wadsworth, 1985). Alternatively, an encryption technique or an error detecting and/or correcting technique might be used to generate a number for use as a hash code.

The comparison of strings can also be performed by numerous techniques. In any case, the pointers are first compared, then the hash codes and finally the contents of the strings themselves.

Figure 3:
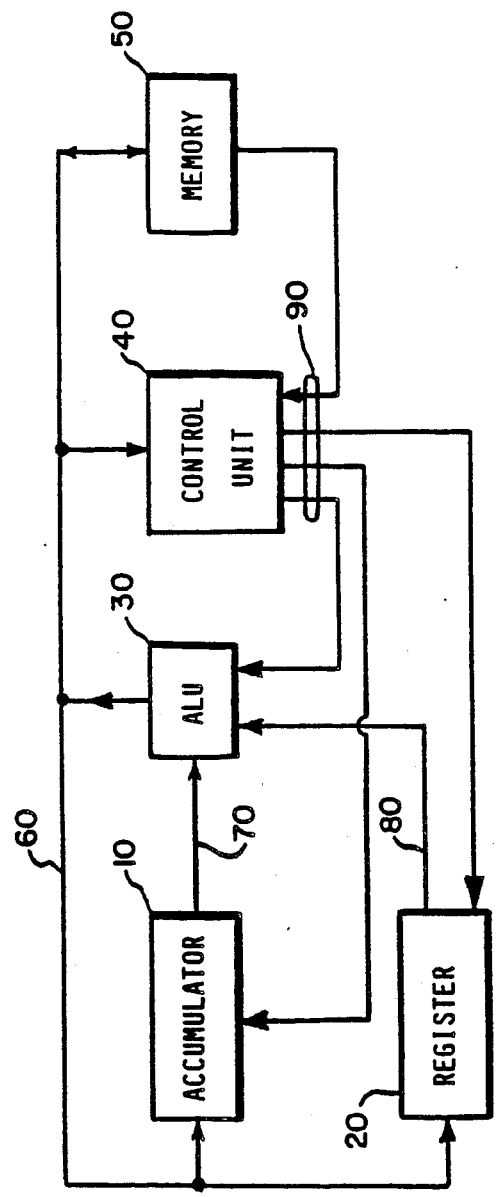
FIG. 3 is a block diagram of illustrative apparatus that may be used in the practice of the invention.

As shown in FIG. 3, illustrative apparatus for making such a comparison comprises a first register or accumulator 10, a second register 20, an arithmetic logic unit (ALU) 30, a control unit 40, a read/write memory 50 and data paths 60, 70, 80, and control lines 90. The pointer, hash code and contents of one string are successively loaded into accumulator 10; and the pointer, hash code and contents of the other string are successively loaded into register 20. The comparison of each of these values is made by ALU 30 under control of control unit 40 and a computer program stored in memory 50.

In practice, the comparison can be performed simply by taking the exculsive OR of the contents of accumulator 10 and the contents of register 20, loading the results of the exclusive OR back into the accumulator and then testing the contents of the accumulator for a non-zero value. Since the exclusive OR of equal binary values is zero while the exclusive OR of different binary values is one, any difference between the contents of the accumulator and the contents of the register will produce a non-zero value in the accumulator when the results of the exclusive OR operation are loaded back into the accumulator.

A computer program for implementing the flow charts of FIGS. 1 and 2 is stored in memory 50. In conjunction with control unit 40, the program generates strings and hash codes, stores such data in a table in memory 50 and provides pointers to such data. Further, the program controls the operation of the ALU, accumulator and register via control lines 90 so as to load pointers, hash codes and string contents into the accumulator and register, make the exclusive OR comparison and test the accumulator for the results of such comparison. Depending on the results of such tests, the program will implement different procedures. Thus, if the contents of the accumulator are zero after comparison of pointers which indicates that the pointers are the same, the program will jump to the next procedure to performed. If the contents are non-zero indicating that the pointers are the same, the program will then test the hash codes by loading them into the accumulator and register, taking their exclusive OR in arithmetic logic unit 30, loading the results of that operation into the accumulator and testing if the contents of the accumulator are zero. If the contents are zero indicating that the hash codes are the same, the program will then perform additional tests to determine if the contents of the strings are the same. These tests may include tests of additional hash codes or even tests of the contents of the strings themselves. If the contents of the accumulator are non-zero indicating that the hash codes are different, the program will jump to the next procedure to be performed.

The specific accumulator, register, ALU, control unit and memory used in practicing the invention are whatever accumulator, register, ALU, control unit and memory are available in the computer on which the program is implemented. In state of the art devices, data transfer between the accumulator, the register, the ALU, and the memory are over parallel data buses 60, 70, 80 typically at least eight bits wide and the ALU typically processes at least eight bits in parallel. Advantageously, the registers and accumulator should be large enough to store the entire hash code so that the entire hash code can be compared in one comparison cycle. If, however, the hash code is larger than the register or accumulator, the comparison can be effected by comparing portions of the code successively.

Specific computer code for generating the hash code and comprising the pointers, hash codes and string contents is set forth in Appendix I.

As will be apparent to those skilled in the art, numerous variations may be made in the practice of my invention.

APPENDIX I

The hash code of the strings is one byte (8 bits), and it is contained in the first word of the string.
The function Str__Hash returns the hash value of an arbitrary number of characters. A character is contained in one byte (8 bits). P points to the first character and Len is the number of characters.

```
char
Str__Hash(P, Len)
char    *P;
int     Len;
{
        char    *P1 = P, *P2 = P + Len;
        char    Hash = 0;
        while (P1 != P2) {
                Hash = Hash *P1++;   /* Execlusive or */
        }
        return(Hash);
}
```

The function Str__Comp compares the strings and if they are the same strings it will return True otherwise False. Besides of comparing the strings, if either string is identified as a run time string, this string is replaced by a pointer to the address of the other string. P1 and P2 are pointers to strings.

```
#define True  1
#define False 0
int
Str__Comp(P1, P2)
int   *P1, *P2;
{
        int     *TP1, *TP2;
        int     i;
        if (P1 == P2) {              /* compare addresses */
                retrun(True);
        }
        if (*P1 != *P2) {            /* compare Hash values */
                return(False);
        }
        /* compare contents of strings, Str__Len__in__Words is */
        /* is a macro computing the length of the string */
        TP1 = P1 + 2;
        TP2 = P2 + 2;
        for (i = Str__Len__in__Words(*P1) ; i > 0 ; i--) {
                if (*TP1++ != *TP2++) {
                        return(False);
                }
        }
        /*
         * strings match. If one is a run time string
         * then make it reference the other.
         */
        if (*(P1+1) == 0) {  /* Is it run time string ? */
                *P1++ = Word(RefTag, P2);
        }
        else {
                if (*(P2+1) == 0) {  /* Is it run time string ? */
                        *P2++ = Word(RefTag, P1);
                }
        }
        return(True);
}
```

What is claimed:

1. In a computer programmed to run a concurrent logic programing language, a method of comparing strings of data generated simultaneously by two or more programs running in parallel comprising the steps of:
   generating a has code for each string, each string also comprising other information,
   generating a unique pointer for each different string, and
   comparing a pair of strings by:
   comparing the pointers for each string,
   if the pointers are different, comparing the hash codes generated for each string, and
   if the hash codes are the same, comparing other information in each said string.

2. The method of claim 1 wherein the other information in each said string is the data of the string.

3. The method of claim 1 wherein the other information in each said string comprises an additional hash code.

4. The method of claim 1 wherein the string includes a header which comprises a bit specifying whether the string is a run time string or a compile time string, said method further comprising the steps of:
   testing said bit in each of two strings that are found to be identical to determine if one of the strings is a run time string, and
   if a run time string is identified, replacing said string with a pointer to the other of said two strings.

5. In a stored-program computer, a method of comparing strings of data comprising the steps of:
   generating a hash code for each string, each string also comprising other information,
   generating a unique pointer for each different string, and
   comparing a pair of strings by:
   comparing the pointers for each string,
   if the pointers are different, comparing the hash codes generated for each string, and
   if the hash codes are the same, comparing other information in each said string.

6. The method of claim 5 wherein the other information in each said string is the data of the string.

7. The method of claim 5 wherein the other information in each said string comprises an additional hash code.

8. The method of claim 5 wherein the string includes a header which comprises a bit specifying whether the string is a run time string or a compile time string, said method further comprising the steps of:
   testing said bit in each of two strings that are found to be identical to determine if one of the strings is a run time string, and
   if a run time string is identified, replacing said string with a pointer to the other of said two strings.

9. Apparatus for comparing strings of data generated simultaneously by two or more computer programs running in parallel comprising:
   means for generating a hash code for each string, each also string comprising other information,
   means for storing each string and hash code generated therefor,
   means for generating a unique pointer for each different string stored in said storing means,
   first and second registers,
   an arithmetic logic unit, and
   means of comparing a pair of said strings comprising:
   means for loading the pointers for such strings into said first and second registers,
   means for comparing the contents of said first and second registers,
   means for loading the hash codes into said first and second registers if the pointers are different as determined by said comparison,
   means for comparing the contents of said first and second registers, and
   means for comparing other information in each said string if the hash codes are the same as determined by said comparison to determine if the strings are the same.

10. The apparatus of claim 9 wherein the other information in each said string is the data of the string.

11. The apparatus of claim 9 wherein the other information in each said string comprises an additional hash code.

12. In a stored-program computer, a method of comparing strings of data comprising the steps of:
generating strings of different data,
generating a hash code for each string,
generating a unique pointer for each different string, and
comparing a pair of strings by:
 comparing the pointers for each string,
 if the pointers are different, comparing the hash codes generated for each string, and
 if the hash codes are the same, comparing data in each said string.

13. In a computer programmed to run a concurrent logic programming language, a method of comparing strings of data generated simultaneously by two or more programs running in parallel comprising the steps of:
generating a hash code for each string, each string also comprising other information, said string including a header which comprises data specifying whether the string is a run time string or a compile time string,
generating a unique pointer for each different string, and
comparing a pair of strings by:
 comparing the pointers for each string,
 if the pointers are different, comparing the hash codes, generated for each string,
 if the hash codes are the same, comparing other information in each said string to determine if the strings are the same,
 if the strings are the same, determining if one string is a run time string, and
 if a run time string is identified, replacing said string with a pointer to the other of said two strings.

14. In a stored-program computer, a method of comparing strings of data comprising the steps of:
generating a hash code for each string, each string also comprising other information, said string including a header which comprises data specifying whether the string is a run time string or a compile time string,
generating a unique pointer for each different string, and
comparing a pair of strings by:
 comparing the pointers for each string,
 if the pointers are different, comparing the hash codes generated for each string,
 if the hash codes are the same, comparing other information in each said string to determine if the strings are the same,
 if the strings are the same, determining if one of the strings is a run time string, and
 if a run time string is identified, replacing said string with a pointer to the other of said two strings.

15. In a stored-program computer, a method of comparing strings of data comprising the steps of:
generating strings of different data,
generating a hash code for each string,
generating other data related to each string,
generating a unique pointer for each different string, and
comparing a pair of strings by:
 comparing the pointers for each string,
 if the pointers are different, comparing the hash codes generated for each string, and
 if the hash codes are the same, comparing said other data related to each said string.

* * * * *